US009140243B2

(12) United States Patent
Gandhi et al.

(10) Patent No.: US 9,140,243 B2
(45) Date of Patent: Sep. 22, 2015

(54) SHAPE MEMORY ALLOY LATCH WITH STABLE ON-OFF POSITION

(71) Applicant: Toyota Motor Engineering & Manufacturing North America, Inc., Erlanger, KY (US)

(72) Inventors: Umesh N. Gandhi, Farmington Hills, MI (US); Christian A. Trager, Canton, MI (US); Clare A. McNamara, Detroit, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 242 days.

(21) Appl. No.: 13/674,150

(22) Filed: Nov. 12, 2012

(65) Prior Publication Data

US 2014/0130491 A1 May 15, 2014

(51) Int. Cl.
*F03G 7/06* (2006.01)

(52) U.S. Cl.
CPC .................................... *F03G 7/065* (2013.01)

(58) Field of Classification Search
CPC .......... F03G 7/065; F01B 29/10; H02N 11/00
USPC .................................... 60/526–527; 310/300
See application file for complete search history.

(56) References Cited

U.S. PATENT DOCUMENTS 5,771,742 A * 6/1998 Bokaie et al. ...................... 74/2
6,186,047 B1 * 2/2001 Baruffaldi ........................ 92/24
6,508,437 B1 * 1/2003 Davis et al. ............... 244/173.2
6,972,659 B2 12/2005 von Behrens et al.
7,364,211 B2 4/2008 Niskanen et al.
7,478,845 B2 1/2009 Mankame et al.
7,709,995 B2 5/2010 Hanlon et al.
8,056,335 B1 * 11/2011 Brown ........................... 60/528
2002/0130754 A1 * 9/2002 Alacqua et al. ............... 337/118
2004/0104580 A1 * 6/2004 Spiessl et al. .................. 292/84
2005/0146147 A1 7/2005 Niskanen et al.
2008/0307786 A1 * 12/2008 Hafez et al. .................... 60/527
2009/0115284 A1 * 5/2009 Liang et al. .................. 310/300
2009/0143730 A1 * 6/2009 De Polo et al. ............... 604/131
2010/0326070 A1 * 12/2010 Hao et al. ....................... 60/527
2011/0179790 A1 * 7/2011 Pretorius .................... 60/641.15

* cited by examiner

*Primary Examiner* — Thomas Denion
*Assistant Examiner* — Shafiq Mian
(74) *Attorney, Agent, or Firm* — Christopher G. Darrow; Darrow Mustafa PC

(57) ABSTRACT

A shape memory alloy (SMA) actuator includes a SMA element connected to a first crown to move the first crown with respect to a second crown along an axis to toggle the actuator rod between a first position and a second position, the first position and the second position maintained when the SMA element is deenergized.

20 Claims, 4 Drawing Sheets

26
46
22
30
32
38A
38
42
44
52
36
A
50
30A
46
40B
40A
34
48
38B
28
Position 1

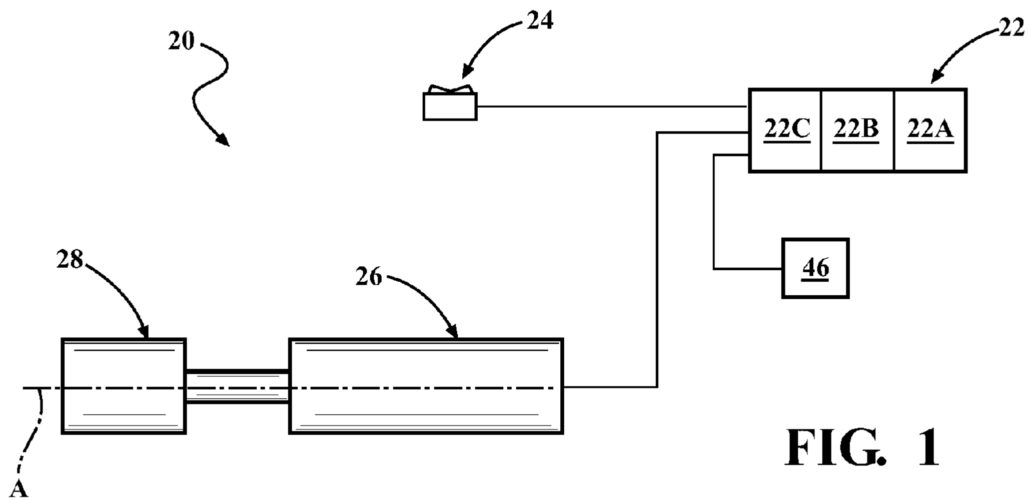
FIG. 1
FIG. 2
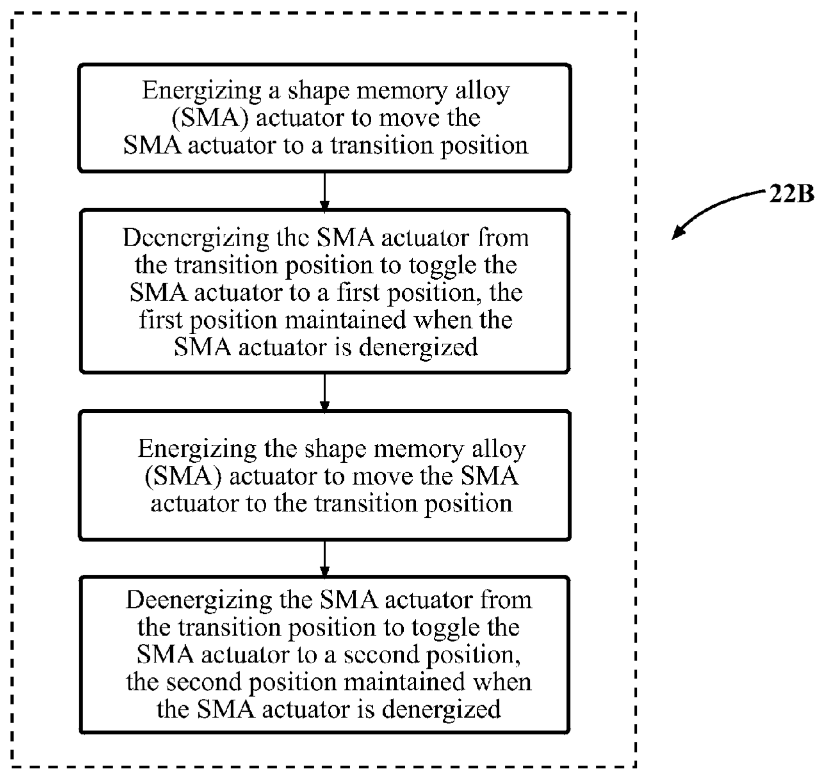

SHAPE MEMORY ALLOY LATCH WITH STABLE ON-OFF POSITION

BACKGROUND

The present disclosure relates to a latch system, and more particularly to a shape memory alloy (SMA) actuated latch.

Latches are operable to hold selectively movable members in a desired position. A user typically pushes or pulls on a handle to release the latch. Many latch applications utilize shape memory alloys as such latches are relatively light and readily packaged. Shape memory alloy latches are powered in the on or off position through the continuous application of power. Continuous power application, however, may not be practicable in every application.

SUMMARY

A shape memory alloy (SMA) actuator according to one disclosed non-limiting embodiment includes an actuator rod along an axis. A first crown engageable with the actuator rod. A second crown engageable with the actuator rod, the first crown axially movable with respect to the second crown along the axis. The SMA element connected to the first crown to move the first crown with respect to the second crown along the axis to toggle the actuator rod between a first position and a second position, the first position and the second position maintained when the SMA element is deenergized.

A shape memory alloy (SMA) latch system according to another disclosed non-limiting embodiment includes a shape memory alloy (SMA) actuator and a control operable to toggle the SMA actuator between a first position and a second position, the first position and the second position maintained when the SMA actuator is deenergized.

A method of toggling a shape memory alloy (SMA) actuator according to another disclosed non-limiting embodiment includes: energizing a shape memory alloy (SMA) actuator to move the SMA actuator to a transition position between a first position and a second position; and deenergizing the SMA actuator from the transition position to toggle the SMA actuator between the first position and the second position, the first position and the second position maintained when the SMA actuator is deenergized.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 1 is a schematic view of a SMA latch system;

FIG. 2 is a schematic block diagram of the control algorithms of the SMA latch system;

DETAILED DESCRIPTION

Figure 3:
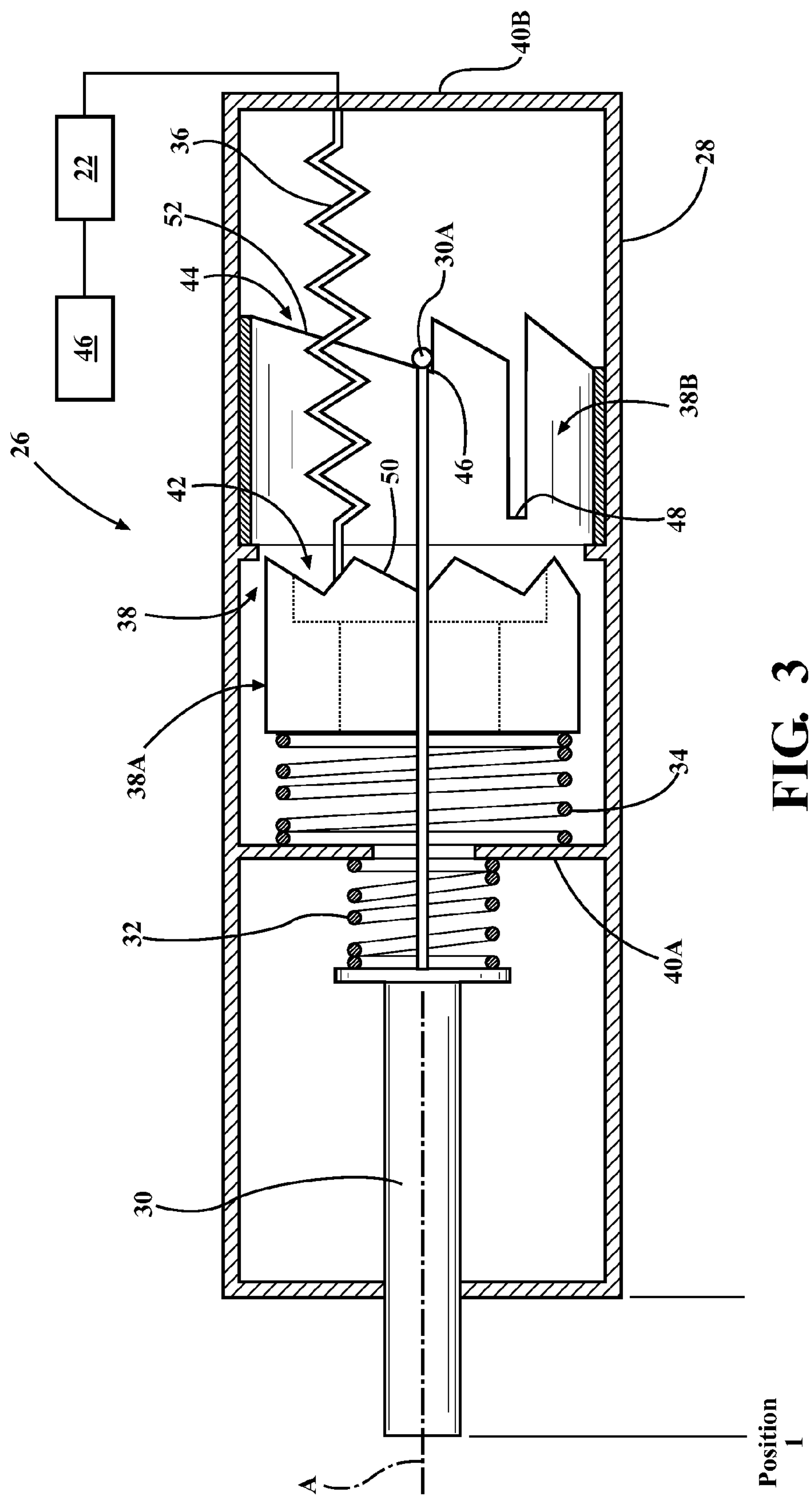
FIG. 3 is an enlarged schematic view of an SMA actuator of the SMA latch system in a first position.

FIG. 1 schematically illustrates a shape memory alloy (SMA) latch system 20. The latch system 20 generally includes a module 22, a control 24 and an SMA actuator 26. The latch system 20 may be utilized to, for example, latch and unlatch a relatively movable component 28 (illustrated schematically) such as a fuel door, vehicle seat, interior compartment panel, exterior panel, trunk, hood, door or other component.

The module 22 executes a control algorithm (FIG. 2) to operate the functions of the SMA actuator 26 in response to the control 24. The functions of the algorithm are disclosed in terms of functional block diagrams, and it should be understood by those skilled in the art with the benefit of this disclosure that these functions may be enacted in either dedicated hardware circuitry or programmed software routines capable of execution in a microprocessor based electronics control embodiment. In one non-limiting embodiment, the module 22 may be a portion of a vehicle control, lock control, or other portion of a vehicle electro-mechanical system.

The module 22 generally includes a processor 22A, a memory 22B, and an interface 22C. The processor 22A may be any type of known microprocessor having desired performance characteristics. The memory 22B may be any computer readable medium which stores the data and control algorithms described herein. The interface 22C facilitates communication with other systems such as the control 24, as well as other systems. The control 24 may be, for example, a switch in the vehicle or other button, either remote or wired to the module 22.

With reference to FIG. 3, the SMA actuator 26 generally includes a housing 28, an actuator rod 30, a first spring 32, a second spring 34, an SMA element 36 and a crown assembly 38. The first spring 32 biases the actuator rod 30 along an axis A outward with respect to a first housing wall 40A. The second spring 34 biases a first crown 38A of the crown assembly 38 along the axis A with respect to a second crown 38B toward said first housing wall 40A. The SMA element 36 is connected between a second housing wall 40B and the first crown 38A to selectively move the first crown 38A relative to the second crown 38B along axis A. In one disclosed, non-limiting embodiment, the first spring 32 is in compression and may be weaker than the second spring 34. The first spring 32 primarily maintains the actuator rod 30 in the last actuated position against the second crown 38B.

The first crown 38A is axially movable with respect to the second crown 38B along the axis A. The second crown 38B is axially fixed within the housing 28 along axis A but may rotate therearound. The first crown 38A includes a series of first teeth 42 which are generally of equivalent height. The second crown 38B includes a series of second teeth 44 which generally define a first height 46 and a second height 48. The first height 46 is displaced from the second height 48 such that the difference therebetween defines the stroke of actuator rod 30. In the disclosed non-limiting embodiment, the second height 48 is defined by a slot which extends parallel to the actuator rod 30 at every other tooth in the series of second teeth 44. A first ramp 50 between each of the series of first teeth 42 defines a slope generally equivalent to a slope of a second ramp 52 between each of the series of second teeth 44. It should be appreciated that various teeth and crown arrangements may alternatively or additionally be provided.

Figure 5:
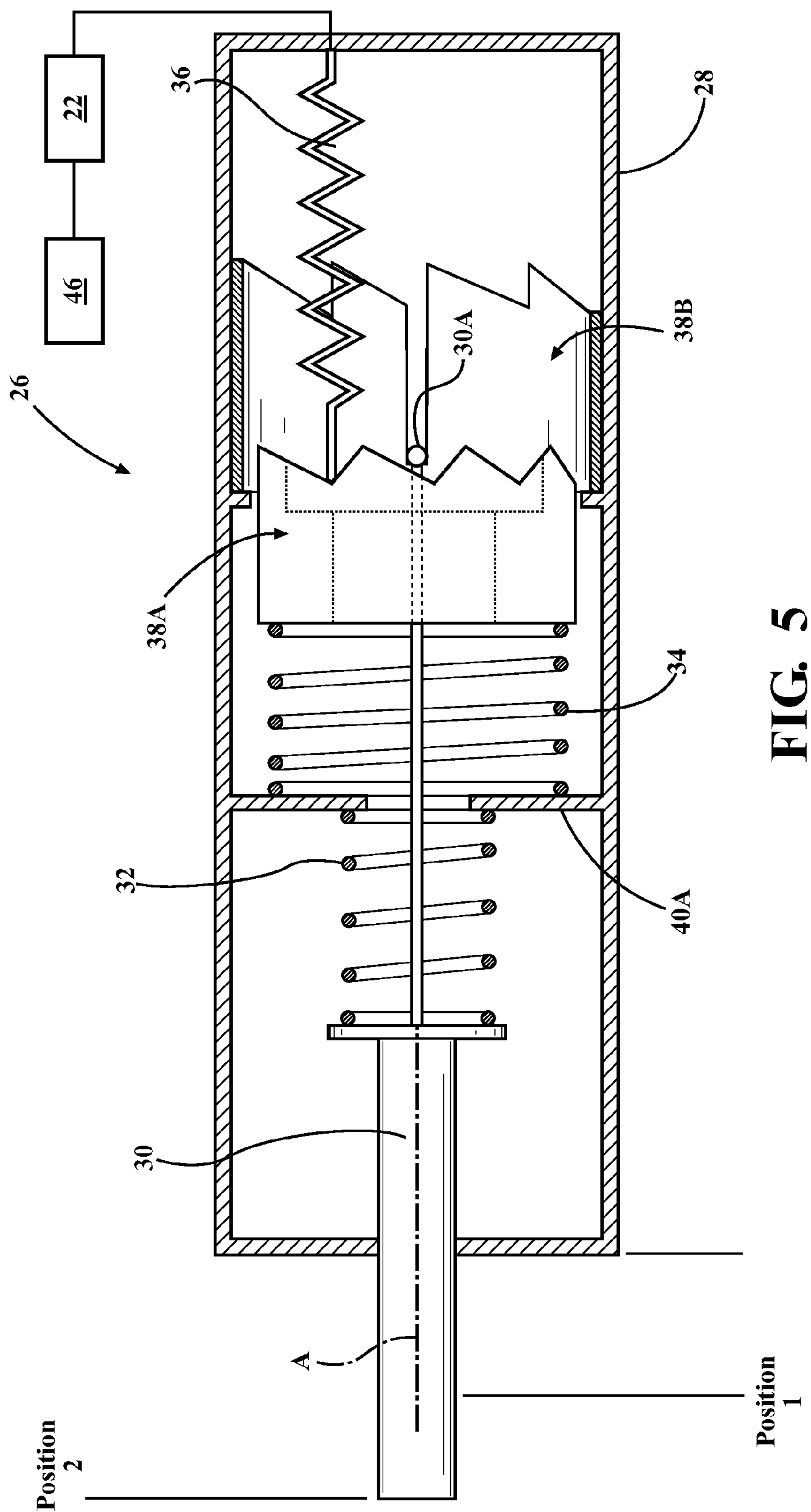
FIG. 5 is an enlarged schematic view of an SMA actuator of the SMA latch system in a second position.

An energy source 46 selectively provides electric current to the SMA element 36 in response to the module 22 and operation of the control 24, e.g., to toggle the SMA actuator 26 between the first position (FIG. 3) and the second position (FIG. 5). Notably, the first position (FIG. 3) and the second position (FIG. 5) are maintained without power from the energy source 46.

Figure 4:
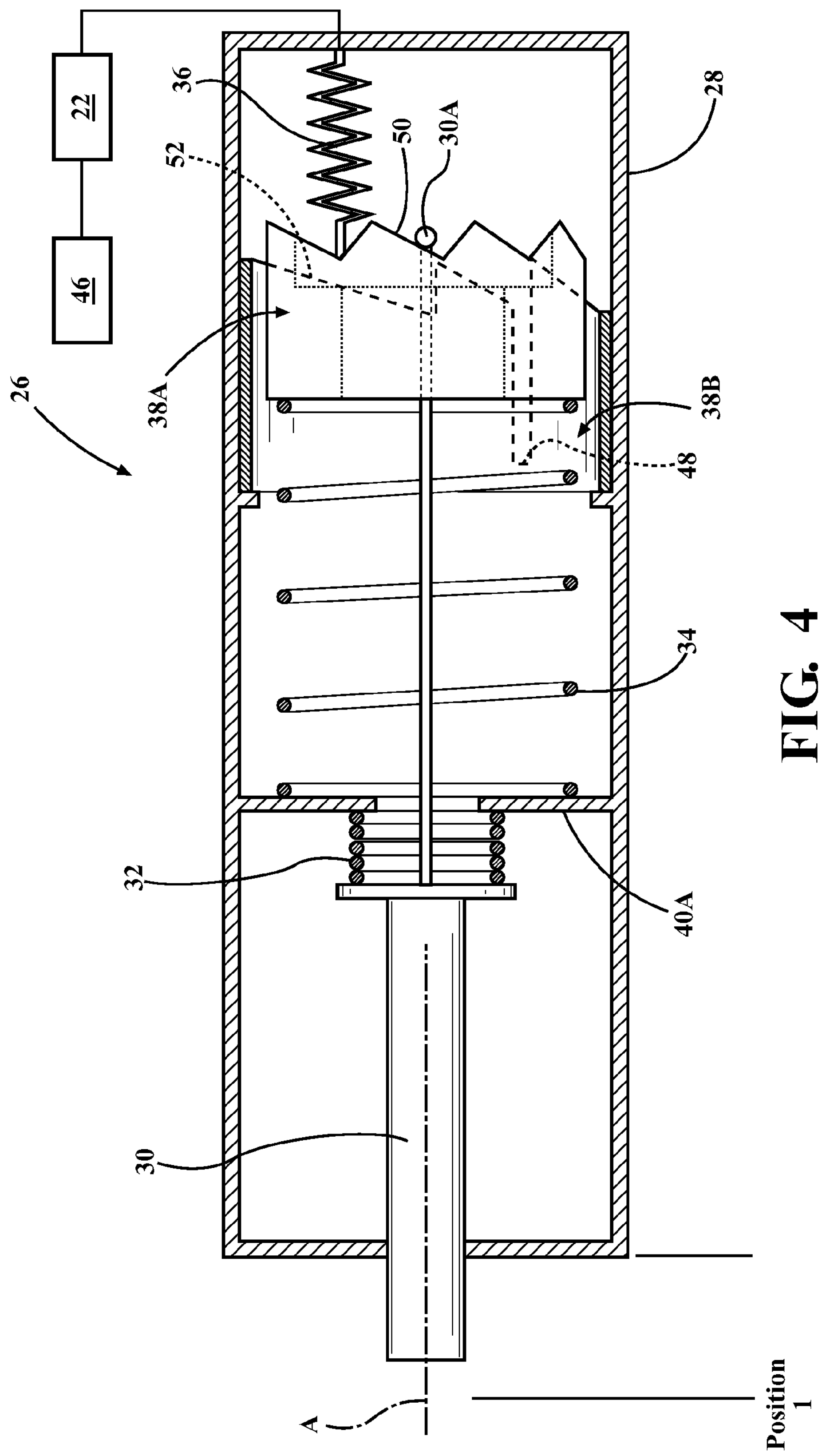
FIG. 4 is an enlarged schematic view of an SMA actuator of the SMA latch system in a transition position.

The energy source 46 provides power such as an electric current to the SMA element 36 sufficient to energize the SMA element 36 and thereby, for example, cause an austenite thermoelastic transformation of the SMA element 36. That is, the SMA element 36 contracts in response to the electric current. Since the SMA element 36 is fixedly attached to the first crown 38A, the contraction force generated by the phase transformation of the SMA element 36 axially moves the first crown 38A with respect to the second crown 38B to a transition position (FIG. 4). The shape, type and size of the SMA element 36 is selected to apply sufficient opposing force to overcome the first and second spring 32, 34 as well as to overcome and thereby operate, e.g. latch and unlatch the component 28 in response to movement between the respective first position (FIG. 3) and second position (FIG. 5).

From the first position (FIG. 3), the thermoelastic contraction force of SMA element 36 exceeds the forces on the actuator rod 30 as well as the bias of the first and second spring 32, 34 such that the first crown 38A moves the actuator rod 30 clear of the series of second teeth 44 (FIG. 4). An end 30A of the actuator rod 30—now clear of the first height 46 defined by the series of second teeth 44 (FIG. 4)—slides down the ramp 50 between each of the series of first teeth 42 toward the ramp 52 between each of the series of second teeth 44 under the bias of the first spring 32 (FIG. 4).

The electric current to the SMA element 36 is then removed in response to the module 22 such that the thermoelastic contraction force of SMA element 36 is released. The first crown 38A is then biased by the spring pressure of the first and second spring 32, 34 such that the actuator rod end 30A continues to slide down ramp 52 between each of the series of second teeth 44. The second crown 38B may rotate around axis A under the cam action between the actuator rod end 30A and the ramp 52 until the actuator rod end 30A engages the second height 48 (FIG. 3). The SMA actuator is thereby in the second position (FIG. 5) without power from the energy source 46.

From the second position (FIG. 5), power from the energy source 46 contracts the SMA element 36 in response to the module 22 and operation of the control 24. The SMA element 36 then moves the first crown 38A to extract the actuator rod end 30A from the second height 48 clear of the second crown 38B (FIG. 4). The electric current to the SMA element 36 is then removed in response to the module 22 such that the thermoelastic contraction force of SMA element 36 is released. The first crown 38A is then biased by the spring pressure of the first and second spring 32, 34 such that the actuator rod end 30A continues to slide down ramp 52 between each of the series of second teeth 44. The second crown 38B again rotates around axis A under the cam action between the actuator rod end 30A and the ramp 52 until the actuator rod end 30A engages the first height 46 (FIG. 3). The SMA actuator 26 is thereby again in the first position (FIG. 3) without power from the energy source 46.

The toggle action may thereby be selectively repeated in response to the control 24 as the first crown 38A is axially moved by the SMA element 36 along axis A and the second crown 38B is rotated around axis A as the actuator rod end 30A moves along the ramps 50, 52.

It should be understood that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A shape memory alloy (SMA) actuator comprising:
- an actuator rod movable along an axis;
- a first crown defining a first set of teeth directly engageable with said actuator rod;
- a second crown defining a second set of teeth directly engageable with said actuator rod, said set of second teeth define a first height and a second height, an axial difference between said first height and said second height defines a stroke of said actuator rod along said axis, said first crown axially movable with respect to said second crown along said axis; and
- an SMA element connected to said first crown to move said first crown with respect to said second crown along said axis to alternately toggle said actuator rod between an actuator rod first position and an actuator rod second position, said actuator rod first position and said actuator rod second position maintained when said SMA element is deenergized.

2. The shape memory alloy (SMA) actuator as recited in claim 1, wherein said actuator rod is spring biased along said axis.

3. The shape memory alloy (SMA) actuator as recited in claim 1, wherein said first crown is spring biased along said axis.

4. The shape memory alloy (SMA) actuator as recited in claim 1, wherein said second crown is rotatable about said axis relative to said first crown.

5. The shape memory alloy (SMA) actuator as recited in claim 1, wherein said second set of teeth define an actuator rod transition position, said actuator rod second position arranged axially along said axis between said actuator rod first position and said actuator rod transition position.

6. The shape memory alloy (SMA) actuator as recited in claim 1, wherein said SMA actuator is moveable along said axis between an SMA actuator first position and an SMA actuator second position, an axial difference between said SMA actuator first position and said SMA actuator second position defines a stroke of said first crown along said axis, said stroke of said first crown being greater than said stroke of said actuator rod.

7. The shape memory alloy (SMA) actuator as recited in claim 5, wherein said actuator rod moves from said actuator rod transition position to at least one of said actuator rod first position and said actuator rod second position when said SMA element is deenergized.

8. The shape memory alloy (SMA) actuator as recited in claim 6 further comprising a biasing member urging said actuator rod toward said actuator rod first position and said actuator rod second position.

9. A shape memory alloy (SMA) actuator comprising:

an actuator rod moveable along an axis between an actuator rod first position and an actuator rod second position;

a first crown defining a first set of teeth directly engageable with said actuator rod;

a second crown including a first stop directly engageable with said actuator rod and a second stop directly engageable with said actuator rod, said first stop defining said actuator rod first position and said second stop defining said actuator rod second position, said first crown axially movable with respect to said second crown along said axis; and an SMA element connected to said first crown to move said first crown with respect to said second crown along said axis to alternately toggle said actuator rod between said actuator rod first position and said actuator rod second position defined by said second crown, said actuator rod first position and said actuator rod second position maintained when said SMA element is deenergized.

10. The shape memory alloy (SMA) actuator as recited in claim 9, wherein said first crown is spring biased along said axis.

11. The shape memory alloy (SMA) actuator as recited in claim 9, wherein said first crown is movable along said axis between a first position, in which said first crown engages said actuator rod, and a second position, in which said first crown is disengaged from said actuator rod.

12. The shape memory alloy (SMA) actuator as recited in claim 9, wherein said actuator rod includes a rod end engageable with said first stop and said second stop.

13. The shape memory alloy (SMA) actuator as recited in claim 9, wherein said first stop is angularly offset from said second stop in a tangential direction relative to said axis.

14. The shape memory alloy (SMA) actuator as recited in claim 9, wherein said SMA element is at least partially disposed within said second crown when said SMA element is deenergized.

15. The shape memory alloy (SMA) actuator as recited in claim 9 further comprising a control operable to energize said SMA element to toggle said actuator rod between said first position and said second position.

16. The shape memory alloy (SMA) actuator as recited in claim 10, wherein said second crown is rotatable about said axis relative to said first crown.

17. The shape memory alloy (SMA) actuator as recited in claim 11 further comprising a first biasing member urging said actuator rod toward said actuator rod first position and said actuator rod second position, and a second biasing member urging said first crown toward said first position of said first crown.

18. The shape memory alloy (SMA) actuator as recited in claim 11, wherein said actuator rod and said first crown are spring biased in a common axial direction.

19. The shape memory alloy (SMA) actuator as recited in claim 11, wherein said first crown is disposed within said second crown when said first crown is arranged in said second position.

20. The shape memory alloy (SMA) actuator as recited in claim 12, wherein said second crown includes a ramped surface inclined relative to said axis, said ramped surface engageable with said rod end.

* * * * *